June 7, 1966  R. J. MILLARD ETAL  3,255,386

SOLID FEED-THROUGH ELECTROLYTIC CAPACITOR

Filed Feb. 15, 1961

INVENTORS
RICHARD J. MILLARD
BY ALFRED WHITMAN

Connolly and Hutz

THEIR ATTORNEYS

United States Patent Office 3,255,386
Patented June 7, 1966

3,255,386
SOLID FEED-THROUGH ELECTROLYTIC
CAPACITOR
Richard J. Millard and Alfred Whitman, Williamstown, Mass., assignors to Sprague Electric Company, North Adams, Mass., a corporation of Massachusetts
Filed Feb. 15, 1961, Ser. No. 89,397
3 Claims. (Cl. 317—230)

This invention relates to a solid electrolyte capacitor, and more particularly to a feed-through capacitor employing a solid electrolyte, and to a method of making the same.

It has become well-known in the communications and related electronic arts to utilize feed-through capacitors to suppress noise. The high freqeuncy (RF and higher) signals causing the interference are by-passed to ground through the dielectric of a feed-through capacitor, and the main signal is transmitted through the conducting portion of the capacitor. This can be accomplished by connecting one electrode of the capacitor into the transmission line, and connecting the opposite electrode to ground. Thus the feed-through capacitor is a filter that is essentially a part of the transmission line.

The conventional measure of the effectiveness of noise suppression is insertion loss (in decibels); higher insertion losses indicate increased effectiveness in suppressing noise (cf. Mil-Std 220A Method of Insertion Loss Measurement). A consideration in obtaining a satisfactory feed-through capacitor is that the capacitor must be capable of carrying power-line currents without heating to the extent that damage occurs, or changing the insertion loss characteristics.

It is an object of this invention to provide a feed-through capacitor of extremely small volume, relative to the prior art, that produces higher insertion losses at the low end of the RF band.

It is another object of this invention to provide a feed-through capacitor of increased effectiveness and efficiency per unit volume in suppressing noise while carrying power-line currents without damage.

These and other objects of this invention will become apparent from the following specification and the accompanying drawing in which.

In general the objects of this invention are achieved by a feed-through capacitor untilizing a solid electrolyte capacitance section. In a specific embodiment, the objects are achieved by mounting a solid electrolyte capacitance section in the shank of a hollow bolt-like casing which is hermetically sealed with glass-to-metal end-seals.

Figure 1:
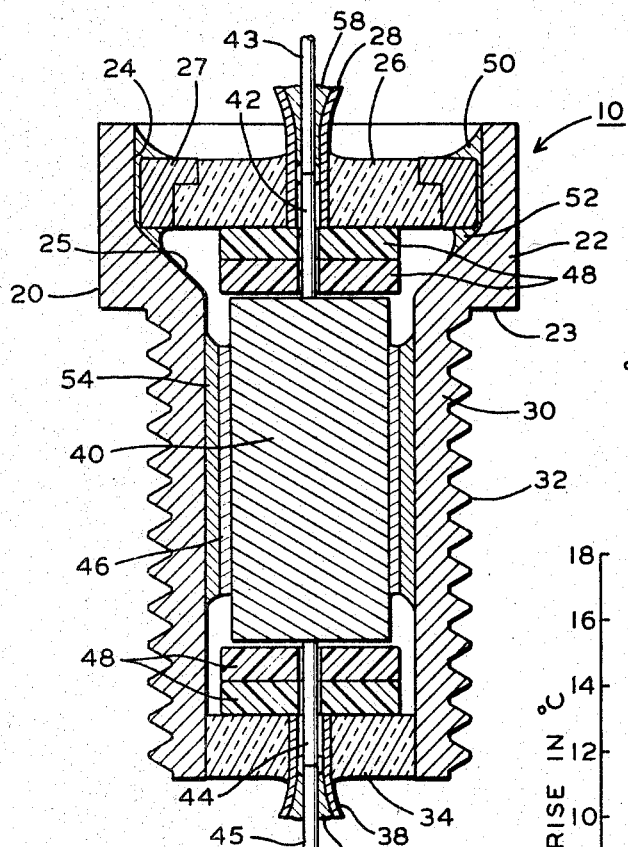
FIGURE 1 is an elevational view in section of a preferred embodiment of this invention.

The preferred embodiment of this invention that is shown in FIGURE 1 comprises a feed-through capacitor 10 having a casing 20 that houses a capacitance section 40. Casing 20 has a normally open-mouthed cup 22 and a threaded shank 30. The bottom 23 of cup 22 offers a flat shoulder to cooperate with shank 30 in mounting capacitor 10 in electrically conductive relation to a grounded bulkhead of the device to be filtered. Casing 20 has inner and outer surfaces that are fabricated to permit ready solderability, as by hot tin dipping or plating.

The inner surface of cup 22 is provided with a straight wall 24 and a sloping wall 25. The junction between walls 24 and 25 provides a seat for glass-to-metal end-seal 26. The straight wall 24 provides a surface that mates with the full length of metallic ring 27 of end-seal 26 to facilitate the soldering operation required to seal casing 20. Eyelet 28 of end-seal 26 is also provided with a solder seal to complete the hermetic sealing of the normally open end of casing 20. In addition to forming a terminus of the seat for end-seal 26, sloping wall 25 functions in the novel soldering operation of the method of this invention (to be described below) by which capacitance section 40 is secured in shank 30.

Threads 32 extend substantially the full length of shank 30 to permit shoulder 23 to be drawn tight against a mounting opening in a bulkhead or chassis plate. One or more straddle-milled flats may be provided on threads 32 to prevent rotation under severe vibration when mounted in a complementary flatted chassis opening. The complementary threads and chassis opening also permit mounting the capacitor without a backing tool. The single mounting wrench and the locking washers and nuts preferably have diameters no greater than cup 20 to permit the maximum utilization of mounting space. Accomplishment of this objective is facilitated by a tubular spanner wrench capable of slipping over shank 30 and having teeth or keys for engagement with slots in the mounting nut.

Shank 30 is closed by an insulating seal, shown as glass-to-metal seal 34 which is fabricated in situ. It should be understood that seal 34 may have a metallic ring similar to ring 27 to permit soldering the seal in position in shank 30. Seal 34 is provided with an eyelet 38 which, like eyelet 28, is soldered closed around a lead-wire of capacitance section 40 to establish a hermetic seal for casing 20.

Capacitance section 40 is a solid electrolyte section of the type described in detail in U.S. Letters Patent 2,936,-514, issued to R. J. Millard on May 17, 1960. By reference to the Millard patent, section 40 may be simply described as comprising a sintered pellet of valve-metal particles, e.g. tantalum and/or niobium particles.

For the purposes of this description, section 40 comprises an anode of sintered together tantalum particles which are thereafter provided with a dielectric layer of tantalum oxide. A solid electrolyte, e.g. manganese dioxide, is thereafter applied as taught by Millard. The active cathode of manganese dioxide is provided with low resistance contact coatings to establish a workable surface for mounting in casing 20.

It is a feature of the preferred embodiment of this invention that the anode itself of section 40 serves as the carrier of the line current. This desirable configuration is obtained by welding lead-wires 42 and 44 to the ends of the anode pellet. Solderable terminal leads 43 and 45, e.g. tinned nickel, are welded to lead-wires 42 and 44 to facilitate closing of eyelets 28 and 38 and to facilitate the utilization of capacitor 10 in an electronic circuit. In this manner, connecting leads 43 and 45 into the line to be filtered causes the line current to pass through the full pellet. It should be understood that other embodiments within the concept of this invention include sintering the anode particles around a current carrying wire that passes completely through the capacitance section, or the use of lead-wires that are partially embedded in the ends of the anode pellet.

The manganese dioxide impregnated section 40 is coated with a carbon layer by painting, or by rolling on a printer's plate. A silver (or other solderable metal) layer 46 is provided over the carbon layer in a like manner of application. It should be noted that the carbon and silver layers do not extend over the end surfaces of the pellet so as to ensure against shorting the cathode to the lead-wires 42 and 44.

With the application of silver layer 46 and the welding of solderable terminal leads 43 and 45, capacitance section 40 is ready for positioning in casing 20 according to the method of this invention. Lead-wire 44 is passed through the eyelet in seal 34 with one or more spacers 48 of insulating material therebetween. End-seal 26 and one or more additional spacers 48 are positioned over lead-wire 42 with the end-seal seated at the junction of surfaces 24 and 25 of cup 22. At each end of the unit, the weld between tantalum lead-wires 42 and 44 and terminal leads 43 and 45 respectively are fashioned to be positioned at the approximate mid-points of respective eyelets 28 and 38.

Spacers 48 are preferably of a fully halogenated ethylene such as tetrafluoroethylene polymer (Teflon) because the soapy surface provided by this resin is not wet by solder, and thereby safeguard against solder bridges being established between anode and cathode. A bead of resin (not shown) may be applied on each lead adjacent the pellet body as an additional safety feature.

A supply of solder 50 is conveniently provided in the form of a preformed ring that is positioned around the top of end-seal 26. Conventional lead-tin solder (60–40) is adequate for the general purposes of the method of this invention, although higher melting solders are in order for high temperature applications of capacitor 10. To assure optimum soldering, the parts of the casing, end-seal, and pellet which are to be joined are first provided with a coating of non-corrosive flux. Heat is applied to solder 50 and/or casing 20 by any of the conventional soldering techniques including resistance heating, infra-red heating, open flame, or conduction iron.

With the parts constructed and arranged as set forth above, the application of heat causes solder 50 to flow along the sloping inner wall of casing 20 and build-up at those points where the solder bridges between adjacent wettable surfaces. Thus solder 50 will unite end-seal 26 to cup 22, as shown at 52, and capacitance section 40 to shank 32, as shown at 54. Surprisingly the amount of solder 50 and the fit of section 40 within shank 30 are satisfactory within broad tolerances, in that solder 50 will adhere only to adjacent wettable surfaces, and any excess will be confined along the inner surface of casing 20. It is important only that enough solder is used so as to substantially completely join silver layer 46 to shank 32. In a like manner, annular clearances between 46 and 32 of 10 mils have been satisfactory to obtain the desired symmetrical uniting of the parts.

Figure 2:
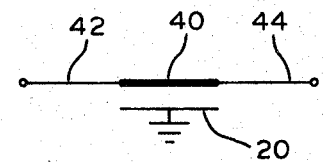
FIGURE 2 is a schematic diagram of the operation of the device shown in FIGURE 1.

A feature of this invention is that solder 54 unites substantially the entire silver coating 46 to shank 30. This construction produces essentially no lead-wire length between the cathode and ground, and hence produces a feed-through capacitor with substantially no self-inductance or residual inductance. The filtering action of the feed-through capacitor of this invention is close to optimum because of this negligible inductance component in the capacitance between the line and ground. Thus, this construction produces an essentially flat impedance over the operating range. The schematic diagram of FIGURE 2 is representative of the feed-through of this invention; however the significant feature of negligible lead-wire between cathode and case is not properly stressed in such a diagram. In a like manner, the extremely short path from casing 20 to ground that is possible by bulkhead mounting of shoulder 23 and threads 32 in intimate engagement with a chassis member is depicted as a short lead-wire only for convenience.

Figure 3:
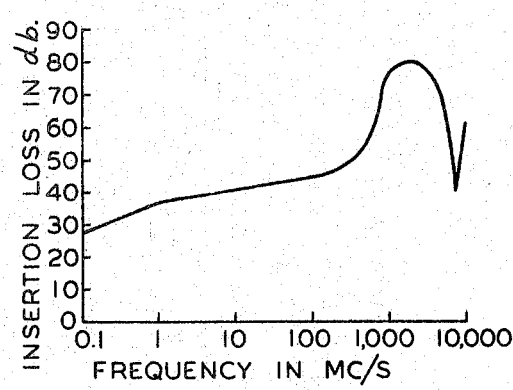
FIGURE 3 is a typical insertion loss v. frequency curve for the device shown in FIGURE 1.

The insertion loss curve shown in FIGURE 3 is a true plot of a 6.8 mfd.-35 v. feed-through capacitor constructed according to this invention. Moreover, this curve is typical of the results attained by this invention. The insertion loss at the low frequency end of the curve is considerably superior to similar plots for other types of feed-through capacitors, whereas the upper end of the curve compares favorably with the prior art while providing considerably greater capacitance per unit volume. It is noteworthy that this advantageous insertion loss curve and high capacitance is obtained in an extremely small dimensional and volumetric case size. A full line of values for the preferred embodiment described above is housed in truly miniature casings wherein the cup has outside diameters less than 0.35" and the overall case lengths are less than 0.85".

Figure 4:
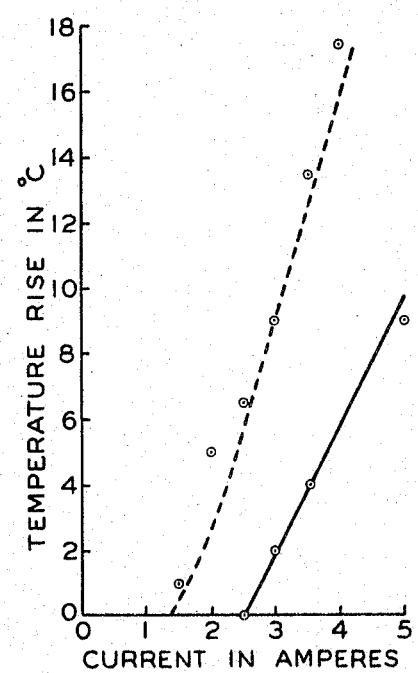
FIGURE 4 is a typical temperature curve comparing a unit of this invention mounted in the preferred manner to a like unit of different mounting.

In addition to offering intimate grounding of the cathode, the casing of the preferred embodiment of this invention provides a unit that is capable of carrying high current without damage to the capacitance section. FIGURE 4 shows the tempertaure advantage obtained by the bulkhead mounting over conventional in-circuit mountings. The bulkhead mounted unit (solid line) carries 5 amperes with only a 9° C. rise in case temperature over the ambient of 85° C.; whereas the in-circuit mounted unit (broken line) has the same 9° C. temperature rise while carrying only 3 amperes. As shown the advantage of the preferred mounting is even more marked at higher currents.

Although this invention has been described in terms of a feed-through capacitor for filtering RF signals, it should be understood that the disclosed structure is capable of other significant utility, including the suppression of power frequency ripples.

Inasmuch as many widely different embodiments of this invention may be made without departing from the spirit and scope thereof, it should be understood that the invention is not limited to the specific embodiment described herein except as defined in the appended claims.

What is claimed is:

1. A feed-through capacitor comprising an elongated porous electrode section of sintered anodizable metal particles and terminals projecting in opposite directions therefrom, a dielectric film covering the surface of the particles, a solid electrolyte covering the dielectric film and a conductive layer covering the electrolyte and being insulated from both of said terminals, an elongated hollow casing, said section being in said casing with said terminals extending from the opposite ends thereof and insulated therefrom, a solder contact along the inner wall of said casing and contacting the exposed surface of said conductive layer so constructed and arranged as to substantially entirely electrically connect the conductive layer to the casing.

2. A feed-through capacitor as claimed in claim 1 having a solder contact flowed along and uniting all adjacent wettable surfaces of the inner wall of said casing and the exposed surface of said conductive layer.

3. A feed-through capacitor comprising an elongated porous electrode section of sintered anodizable metal particles and terminals projecting in opposite direction therefrom, a dielectric film covering the surface of the particles, a solid electrolyte covering the dielectric film and being insulated from both of the terminals, a hollow bolt-like casing, said section being in the shank of said casing with said terminals extending from the opposite ends thereof and insulated therefrom, a solder contact along the inner wall of said casing and contacting the exposed surface of said conductive layer so constructed and arranged as to substantially entirely electrically connect the conductive layer to the casing.

References Cited by the Examiner
UNITED STATES PATENTS

| | | | |
|---|---|---|---|
| 2,756,375 | 7/1956 | Peck | 317—242 |
| 3,029,370 | 4/1962 | Hill | 317—230 |
| 3,036,249 | 5/1962 | Hall | 317—230 |

FOREIGN PATENTS 734,067    7/1955    Great Britain.

JOHN W. HUCKERT, *Primary Examiner.*

SAMUEL BERNSTEIN, *Examiner.*

J. D. KALLAM, *Assistant Examiner.*